United States Patent
Rybacki et al.

(10) Patent No.: US 7,425,952 B2
(45) Date of Patent: Sep. 16, 2008

(54) THREE-DIMENSIONAL VISUALIZATION ARCHITECTURE

(75) Inventors: Richard M. Rybacki, San Antonio, TX (US); Andrew J. Hansen, Greenland, NH (US)

(73) Assignee: MetaVR, Inc., Brookline, MA (US)

( * ) Notice: Subject to any disclaimer, the term of this patent is extended or adjusted under 35 U.S.C. 154(b) by 333 days.

(21) Appl. No.: 11/113,804

(22) Filed: Apr. 25, 2005

(65) Prior Publication Data

US 2006/0109267 A1 May 25, 2006

Related U.S. Application Data

(60) Provisional application No. 60/630,306, filed on Nov. 23, 2004.

(51) Int. Cl.
*G06T 15/30* (2006.01)
*G06T 17/00* (2006.01)
*G06T 17/20* (2006.01)
*G06K 9/36* (2006.01)
*G06K 9/32* (2006.01)

(52) U.S. Cl. .................. 345/419; 345/423; 345/428; 382/285; 382/293; 382/299; 382/305

(58) Field of Classification Search ......... 345/418–423, 345/426, 581–587, 606, 643, 522, 536, 537, 345/541, 545, 428, 698, 589, 552; 382/283, 382/285, 293, 299, 305

See application file for complete search history.

(56) References Cited

U.S. PATENT DOCUMENTS

| | | | | |
|---|---|---|---|---|
| 5,870,098 A * | 2/1999 | Gardiner | ..................... | 345/426 |
| 5,999,187 A * | 12/1999 | Dehmlow et al. | ........... | 345/420 |
| 6,606,731 B1 * | 8/2003 | Baum et al. | ..................... | 716/3 |
| 2001/0040586 A1 * | 11/2001 | Yokoyama et al. | .......... | 345/672 |
| 2003/0117398 A1 * | 6/2003 | Hubrecht et al. | ............ | 345/423 |
| 2004/0012563 A1 * | 1/2004 | Papakipos et al. | ........... | 345/157 |
| 2004/0169663 A1 * | 9/2004 | Bernier | ....................... | 345/629 |
| 2005/0207630 A1 * | 9/2005 | Chan et al. | .................. | 382/131 |
| 2006/0022977 A1 * | 2/2006 | Bronder | ...................... | 345/424 |

* cited by examiner

*Primary Examiner*—Wesner Sajou
(74) *Attorney, Agent, or Firm*—Bromberg & Sunstein LLP (57) ABSTRACT

A virtual terrain architecture and computer program product for employing a geocentric coordinate system, using a tessellated three-dimensional shape for representing a celestial body, and mapping terrain data to the tessellated three-dimensional shape is disclosed. In one embodiment, the methodology begins with a seed polyhedron such as an ellipsoid model. The seed ellipsoid is preferably composed of a plurality of triangle primitives. After selection of the seed ellipsoid, the ellipsoid is subdivided using tessellation. Each triangular element is subdivided into four sub-elements which are also triangular in shape. As the elements are further subdivided, the triangles of the ellipsoid model create a sphere that is representative of the earth or other celestial body. Tessellation continues until a desired resolution is reached for each triangular element. Once a sphere has been substantially formed, terrain data is mapped to the triangular elements and the data is converted to geocentric coordinates and stored in a database. Each triangular element is separately indexed according to the triangular elements name. By creating a geocentric representation, the earth's curvature and polar regions can be accurately represented. By using a tessellation process, tiling for the geocentric coordinate system is achieved. Thus, the tiles can be paged as discrete elements.

46 Claims, 8 Drawing Sheets

THREE-DIMENSIONAL VISUALIZATION ARCHITECTURE

PRIORITY

The present application claims priority from U.S. Provisional Patent Application 60/630,306 filed on Nov. 23, 2004 which is incorporated herein by reference in its entirety.

TECHNICAL FIELD AND BACKGROUND ART

The present invention relates to virtual terrain architectures for three-dimensional visualization.

Virtual terrain databases for three-dimensional visualization are typically based on some type of map projection. Some common map projections used are Universal Transverse Mercator (UTM), Geodetic, Lambert Conic, and Flat Earth among several others. A database projection warps the curved surface of the earth onto a flat X-Y plane to create a local Cartesian coordinate system that simplifies the mathematics of a simulation.

Projection-based database architectures typically subdivide the X-Y extents of a desired geographic region into small, uniformly-sized, rectangular areas commonly referred to as tiles or patches. The geographic coverage of the entire database is then a mosaic of these tiles. Database tiles typically represent a unit of database compiler output, a load module or unit of paging by the runtime system, and/or a unit of culling by the runtime system.

One problem with such projection-based systems can be seen by looking at a world map. On a world map, areas that are near the north or south poles are distorted when projected into this two dimensional flat space as opposed to a three dimensional representation.

A more ideal and accurate representation of the earth's surface is an earth-centered, earth-fixed coordinate system that accurately represents curvature of the earth and deals with ordinate axis convergence at the poles. Such a coordinate system is often referred to as geocentric. Projection-based database generating systems do not create geocentric data, since these databases store data in two-dimensional space. Similarly, the projection-based image rendering systems can not render data in a geocentric coordinate system due to the incompatibility of data types. Furthermore, since there is no X-Y plane onto which the database has been projected in a geocentric coordinate system, classic tiling schemes used for database paging do not map well into the geocentric environment.

SUMMARY OF THE INVENTION

A virtual terrain architecture and computer program product employing a geocentric coordinate system and using tessellation of a polyhedron or spheroid for representing terrain data is disclosed. In one embodiment, the methodology begins with a three-dimensional seed polyhedron such as an ellipsoid model. The seed ellipsoid or is preferably composed of a plurality of triangle primitives. In other embodiments, other shapes may be employed, such as rhomboids. After selection of the seed ellipsoid, the ellipsoid is subdivided using tessellation. Each triangular element is subdivided into four sub-elements which are also triangular in shape. As the elements are further subdivided, the triangles of the ellipsoid model create a sphere that is representative of the earth or other celestial body that is being represented in geocentric coordinates. Tessellation continues until a desired resolution is reached for each triangular element.

Once a sphere has been formed, terrain data is converted to geocentric coordinates and the converted data is mapped to the triangular elements and stored in a database. Each triangular element is separately indexed according to the triangular element's name. By creating a geocentric representation, the earth's curvature and polar regions can be accurately represented. By using a tessellation process, tiling for the geocentric coordinate system is achieved. Thus, each tile is a discrete element and therefore, the tiles can be paged.

During the tessellation process, each triangular element is named according to its tessellation history. The name of each triangular element becomes a compilation of the name of its parent triangular element and the name of any higher level triangles from which the parent triangle was created. In this fashion, no indexing information needs to be provided with the triangular element other than the triangular element's file name in order to determine its global position, since the actual position of each of the triangular primitives from the seed polyhedron are known. Thus, the name provides all of the information that is necessary for determining the location of the triangular element on the globe.

Because each triangular element is separately indexed according to its file name, each triangular element can be separately processed and rendered. A plurality of processors can be used for the generation and rendering of a geographical region that requires more than one triangular element. Additionally, by having each triangular element as a separate file, images can be rendered even when there is sparse coverage, i.e. contiguous triangular elements are not present. In such a system, when information for a triangular element changes, the updated information can be compiled and provided to the rendering engine without having to restart the run-time system.

In another embodiment of the invention, a method of rendering a perspective view from data stored in the database is disclosed. The system defines a viewing frustum based upon the desired perspective view. The perspective view is based at least upon information concerning the position, orientation, and field of view. Once the frustum is defined, a seed three-dimensional shape such as a polyhedron, or spheroid is retrieved. Each of the primitive elements forming the seed polyhedron is associated with a known spatial location, such as global positions of longitude and latitude. The system then determines if any of the primitives from the seed polyhedron are within the viewing frustum. If a primitive is within the viewing frustum, the primitive is tessellated, and the smaller primitives are checked to see if they are within the viewing frustum. This process is continued until a desired resolution is reached. The same naming convention is preferably used during the rendering process as was used during the database construction. As such, the data from the database can be called up by accessing the file name, without having to create a separate look-up table. Once the data from the database is accessed, the data may be rendered using a geocentric-rendering engine.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

The following terms in this disclosure and the appended claims shall have the meaning presented here unless the context indicates otherwise. The term "terrestrial" and "terrestrial data" shall refer to land-based data. Terrestrial may refer to earth-based data or data from another celestial body. Terrestrial data case may include both imagery and elevation data. The term "pagable" shall refer to data within a computer imagery rendering system that can be independently rendered on a display device without accessing other stored data. Thus, a pagable primitive has associated data that can be rendered by a rendering engine by accessing the file containing the pagable primitive data. The term "perspective" or "perspective view" shall refer to at least the position, orientation, and field of view that are used by a rendering engine for rendering imagery. Additionally, a perspective may also include the maximum viewing distance. The term "spheroid" shall refer to a substantially spherical shape that is composed of a plurality of primitive elements.

In one embodiment of the invention, a computer system and methodology for producing geocentric data that accounts for the curvature of the earth for use with a three-dimensional visualization rendering engine is disclosed.

Figure 1:
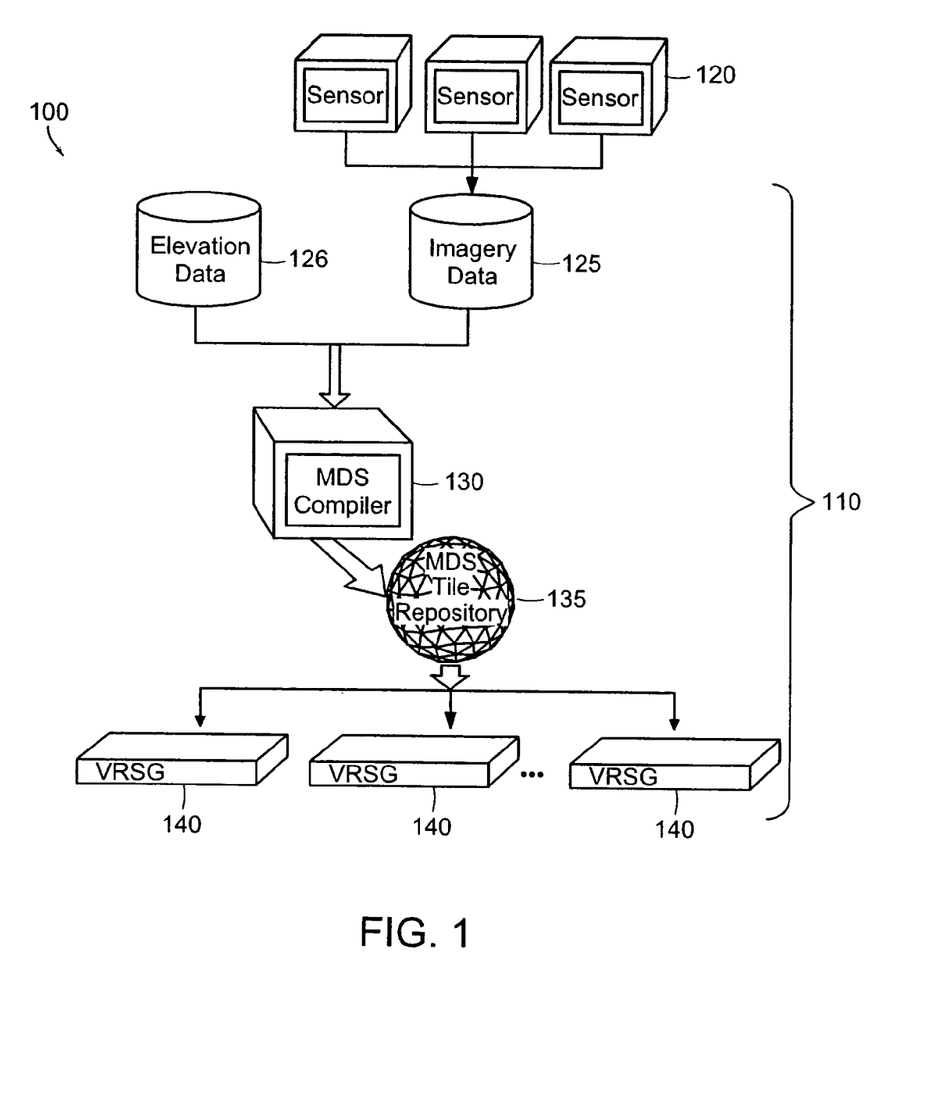
FIG. 1 graphically represents one embodiment of the system for producing a geocentric data for use with a rendering engine.

FIG. 1 represents an environment 100 and computer system components 110 that are used for generating three-dimensional imagery in one embodiment of the invention. Sensors 120 are used to sense data from various sources. For example, a sensor can be a digital or analog aerial or satellite photography camera or other measurement sensor. If the image is an analog image, the analog image is scanned and transferred to a digital format. The sensor information is then stored in memory 125, 126. Although two memory locations are shown in FIG. 1, it should be understood that one memory may be used for storing both imagery data and elevation data. As shown, the imagery data is stored in one memory location and elevation data in another memory location. The data that is stored in memory is associated with a coordinate system. For example, digital image data is associated with a planar coordinate system, such as an X-Y coordinate system. The elevation data provides information related to the digital image data addressing the third coordinate axis, Z. A database compiler 130 labeled an MDS compiler in the Fig. retrieves the data from memory 125, 126. The data then goes through a process called orthorectification where the imagery is projected into the target coordinate system. Orthorectification is the process undertaken to ensure that each image pixel is in its correct geographical position and to compensate for distortion caused by the terrain and the camera. This process is known to one of ordinary skill in the art. After orthorectification, the database compiler then converts the data to a geocentric coordinate system and maps the data to primitive elements from a tessellated three-dimensional shape, such as a polyhedron or spheroid. The imagery is typically projected in a manner such that the scan lines correspond to lines of latitude and the columns of the image correspond to lines of longitude. This mapped data is stored in a database 135, which is labeled as the MDS tile repository in the Fig. The terrain database stores both the terrain polygons, and the texture applied to them, as well as the meta-data necessary to combine the two at runtime.

Once the data is stored in this database, one or more rendering engines can access the data and render the data in real-time. The rendering engines 140 are labeled VRSG in the Fig.

As stated, each triangular primitive is represented within the computer system by a single database file. The filename is a bit pattern that records the recursion history of the tessellation process leading to any given primitive. This naming convention ensures that unique and repeatable filenames will be generated. It also negates the need for explicit indexing information. Eliminating metadata from the database representation prevents overhead that would grow with geographic extent or increased resolution of source data. In one embodiment, the tile names are of the form <8-digit-hex-number>.mds. An example is 4bf20b00.mds. The upper-order 6 bits identify the triangle of the seed icosahedron. Subsequent 2-bit pairs define which child of the parent triangle the tile is derived from. By knowing the position of the triangular elements of the seed icosahedron relative to the geocentric coordinate system (or longitude and latitude), the position of all other triangles can be easily determined based upon the file name. Thus, the system can easily and quickly select a triangular element (and its associated data) to be used in rendering a desired geographic region.

Figure 2:
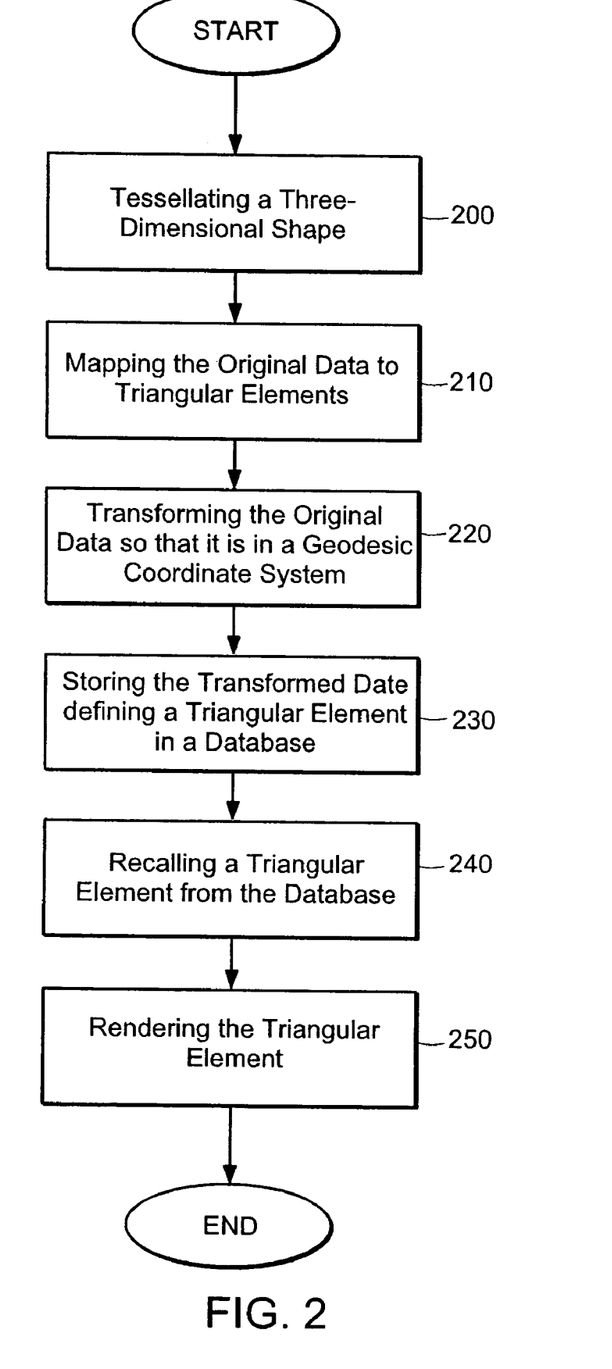
FIG. 2 is a flow chart showing the steps for rendering imagery data using triangular primitives and a geocentric coordinate system.

The methodology for storing and rendering data associated with a geocentric coordinate system is shown in the flow chart of FIG. 2. The flow chart begins after the data has been gathered from the source (aerial photography/satellite). The source data is representative of the imagery and elevation information, such as GIS data (real-world photographic imagery, digital elevation models, and vector features). The computer system performs tessellation of a seed three-dimensional shape that is constructed of a plurality of primitives 200. In one embodiment, a three-dimensional ellipsoid is used and is preferably representative of an Earth-Centered, Earth-Fixed (ECEF) reference ellipsoid wherein each primitive of the seed ellipsoid is associated with a corresponding location on the Earth. The database compiler then maps the data to primitive elements from the tessellated seed three-dimensional polyhedron 210 which are preferably triangular primitives. The database compiler transforms the data into the appropriate coordinate system 220. In one embodiment, the coordinate system is a geocentric coordinate system. The resulting triangular primitives are stored in a database wherein each triangular primitive is separately retrievable 230. A rendering engine recalls a triangular primitive from the database 240. The rendering engine then transforms the data of the triangular primitive into the current viewing coordinate system and provides the data to a display device 250. Rendering engines capable of rendering geocentric databases can then be used to render the data. OpenFlight™ is an example of one commercial database format that can encode geocentric terrain.

Figure 3A:
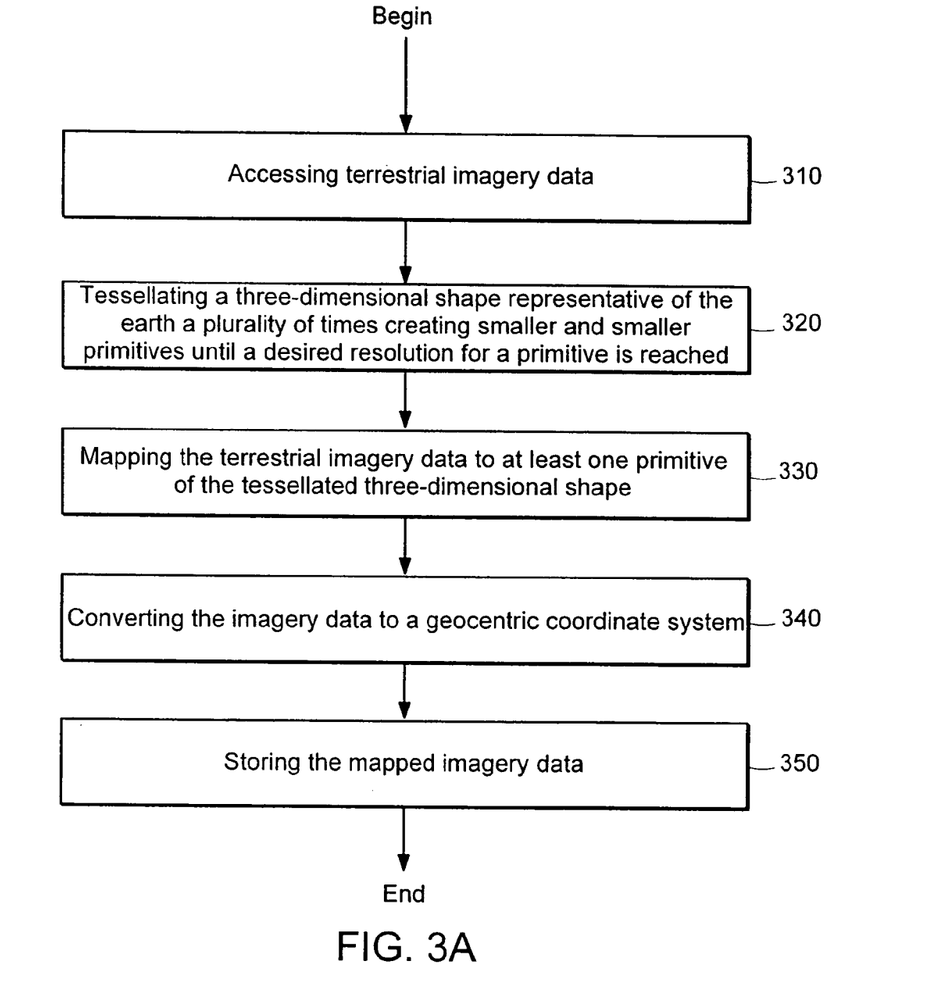
FIG. 3A is a flow chart describing the creation of a pagable database.
Figure 4A:
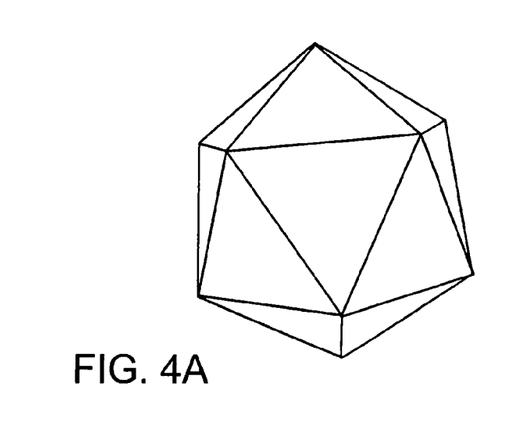
FIGS. 4A-4D shows visually the process of geodesic tessellation.

FIG. 3A is a flow chart describing the creation of a pagable database in more detail. First, terrestrial imagery data is accessed (310). The data may be accessed from stored memory as shown in FIG. 1, or the data may be acquired in real-time from satellites or airplanes that can transmit digital photographic data. The database compiler, which is a processor that executes software code, then begins the tessellation process (320). Data representative of a three dimensional shape such as a polyhedron or spheroid is retrieved from memory. The database compiler either receives as input or retrieves from memory data that indicates the desired resolution for each pagable primitive. The resolution refers to the area of land/water that is represented by the primitive. For example, if 100 km$^2$ triangular tiles are desired for the earth, a WGS84 ellipsoid as shown in FIG. 4A can be tessellated nine times. Each of the resulting triangular primitives will represent a 100 km$^2$ area. As each of the triangular tiles is subdivided in the tessellation process, the tiles are assigned a name. The name for each tessellated primitive is based upon the parent primitive, which is ultimately based upon the original primitives in the seed three-dimensional shape. This naming convention allows for any primitive to be easily traced to an original primitive. By creating this naming convention, no meta-data needs to be stored or associated with a primitive in order to determine its position. The longitude and latitude associated with each original primitive in the seed three-dimensional shape is predetermined. Based upon the tessellation process, the processor may associate longitudes and latitudes with each of the smaller and smaller primitives that result from the original primitives. Thus, the processor maintains in memory the boundary points for each primitive of the tessellated seed three-dimensional shape.

The imagery data is then mapped to the primitives (330). The imagery data that is retrieved is associated with a coordinate system. The coordinate system may be longitude and latitude or may be simply an X-Y coordinate system. If there is a discrepancy between coordinate systems of the primitives and the data, the data or the primitive boundary locations is transformed so that the two coordinate systems are consistent. The data is then mapped to the appropriate primitive.

In one embodiment, the imagery and elevation data are stored in a raster format and exist in some form of a projection, such as, Geodetic and UTM projections. The textures are populated by calculating the interpolated geocetric coordinate of every pixel in the texture as interpolated across the plane of the triangle. The corners of the triangle are mapped to three corners of the texture map.

The processor then transforms the imagery data from its original flat X-Y coordinate system into a coordinate system that is a linear transformation of the Earth-Centered, Earth-Fixed (ECEF) reference ellipsoid. This coordinate system is a geocentric coordinate system as is known in the art (340). In the embodiment mentioned with respect to the previous step, the geocentric coordinates of each pixel can be interpolated from the three corners by using barycentric weighting.

The geocentric coordinate data values may be stored as single precision values in one embodiment of the invention. Storing the data values as single precision allows the data to be readily processed by rendering engines that have single precision 3D pipelines. Single precision also allows for more data to be stored in the cache of the processor during display. For a desired region that is to be displayed on a display device, a single precision representation would consume half the amount of memory in the processors cache as double precision values, allowing for more terrain data to be cached and more area to be immediately processed. To store the data as single precision, a local coordinate system is used such that the magnitude of the values stored is bounded to preserve a desired minimum spatial resolution. Part of the triangular primitive's metadata includes the tile's origin in geocentric coordinates, as well as the tile's orientation relative to the geocentric coordinate system. In the present embodiment, the triangular primitive's origin is chosen as the center of the primitive in the geocentric coordinate system. This is achieved by averaging the 3 vertices of the primitive. The primitive's orientation is somewhat arbitrary. One method of representing the orientation of a primitive is that the primitive's local X axis is defined by (v1-v0) where v0, v1, and v2 are the 3 vertices of the primitive in geocentric coordinates on a WGS84 ellipsoid. In this representation, the primitive's Z axis is given by the cross product of (v2-v0) and (v1-v0). The tile's Y axis is the cross product of the X and Z axes. This defines a localized Cartesian coordinate system for the primitive's vertex data. In other embodiments, the primitive's vertex data is converted directly to a geocentric coordinate system. Due to the magnitude of the values however double precision would be required.

The data is then saved and is associated with the name of the triangular primitive (350).

Figure 3B:
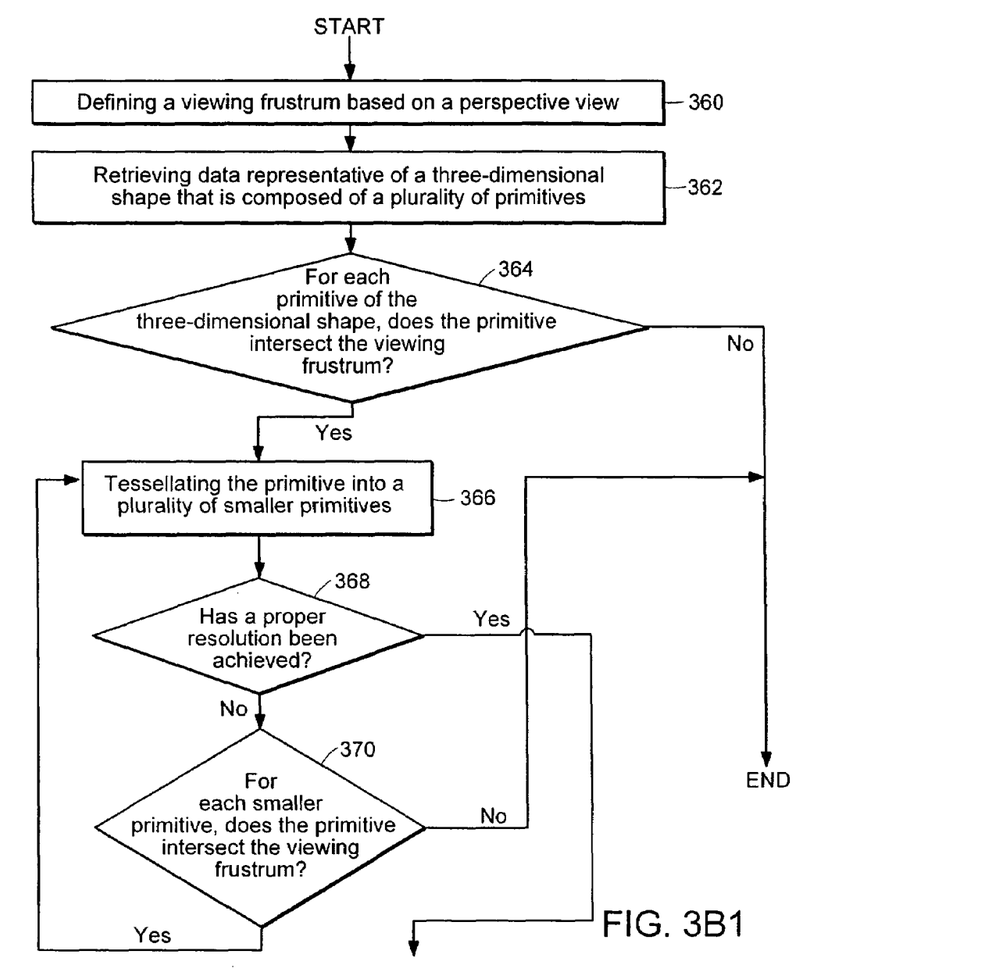
FIG. 3B is a flow chart describing the rendering of imagery data from the pagable database of FIG. 3A
Figure 3B:
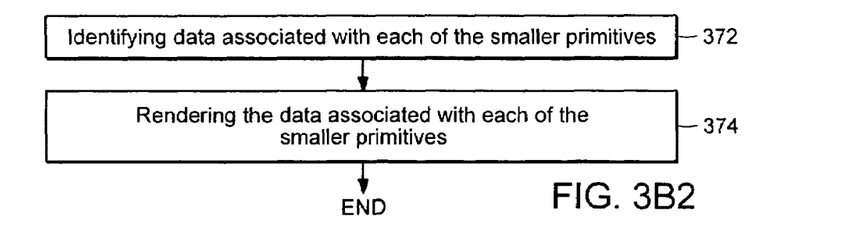

FIG. 3B1 is a flow chart that describes the rendering of imagery data from the pagable database. A rendering engine which may be a processor ruining computer code receives as input information regarding a perspective view including an origin point, orientation, viewing angle, and viewing distance. A viewing frustum is then defined by the rendering engine using techniques known in the art (360). The rendering engine then retrieves data representative of a thee-dimensional shape that is composed of a plurality of primitives (362). The same thee-dimensional shape that was used during the creation of the database is used during this process for rendering. The rendering engine determines which of the original primitives within the three-dimensional shape are within the viewing frustum (364). The primitives that are within the viewing frustum are then tessellated into smaller primitives (366). The system then checks to see if the proper resolution for the desired perspective view has been reached (368). For example, the data base may contain data that has a resolution of 100km per primitive, however the desired perspective may require that the resolution is only at 500km per primitive, and therefore the thee-dimensional shape, such as the WGS84 ellipsoid, may only need to be tessellated five times as opposed to tessellating the ellipsoid nine times as was done to create the database. Therefore, after five tessellations, the proper resolution would be achieved. If the proper resolution has not been achieved, the system checks to see if the smaller primitives from the tessellation process intersect the viewing frustum (370). For each primitive that does not intersect the viewing frustum, the primitives are discarded. For each smaller primitive that does intersect the viewing frustum, the smaller primitives are tessellated. The loop continues until the proper resolution as been achieved. The flow chart then continues to A. For each of the primitives at the desired resolution that are in the viewing frustum, the system accesses the created database and locates the data that is associated with the primitives (372) as shown in FIG. 3B2. The data can be readily found based due to the employed naming convention. Since the database is created using the same thee-dimensional shape as is used during the rendering phase, the name of each primitive is identical and therefore the data associated with the primitive can be quickly located. In the preferred embodiment, the names of each primitive are based upon the names of each parent and ancestor primitive. This process assures that each generated filename will be unique. It also provides a convenient mechanism to go in the reverse order (ie from a filename to a particular triangle on the globe).

Finally, the geocentric data is rendered by a geocentric rendering engine using techniques known to those of ordinary skill in the art (374). It should be understood that not all possible steps taken during the creation of a visualization database or rendering of a perspective view are included in the previous flow charts. Additional enhancements, corrections, and modifications to the source data may occur as are known in the art, without deviating from the inventive concept.

Figure 4B:
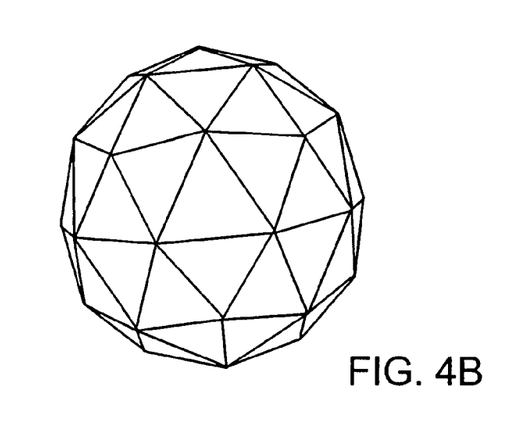
Figure 4C:
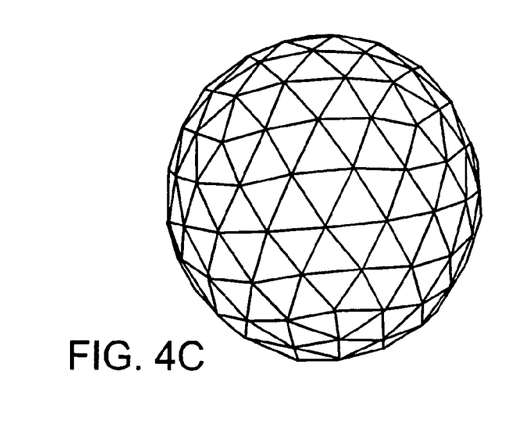
Figure 4D:
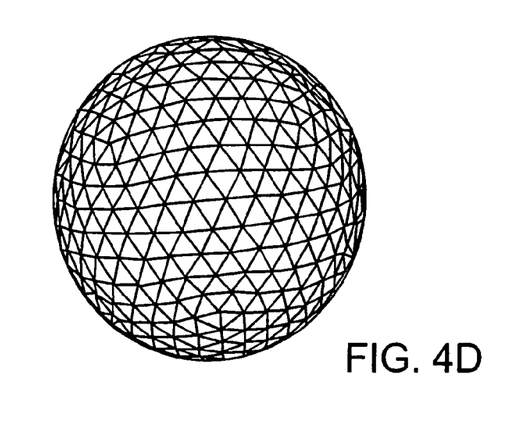

FIGS. 4A-4D illustrates the tessellation process that is performed by the computer system in order to create a representation of the earth or another substantially spherical body for mapping the geocentric coordinate data. The Figures are provided to graphically show the process, however the process would preferably not be displayed on a user's display device. The computer system begins with a polyhedron, such as an ellipsoid that is stored in associated memory. Each triangular primitive is associated with a different location on the earth such that the longitude and latitude for the area of each triangular primitive is known. An example of a seed polyhedron is shown in FIG. 4A. Each triangular primitive is subdivided into four equally smaller triangles by bisecting each of the three triangle edges as shown in FIG. 4B. The triangles that are generated are nearly equal in area, and nearly equilateral in shape. Upon bisection, the newly created vertices are then placed on the ellipsoid. This recursion continues until the desired level of tessellation is achieved. FIG. 4B shows a first level of recursion. FIG. 4C shows a second level of recursion wherein the polyhedron begins to look more spherical. FIG. 4D shows the convergence of the ellipsoid after 3 levels of recursion in the geodesic tessellation process. In FIG. 4D, the polyhedron visually represents a sphere. To achieve an individual triangular tile size of approximately 100 $km^2$ for the earth, nine levels of recursion over a WGS84 ellipsoid are required, yielding 5,242,880 total triangles. Across the entire set of triangles covering the WGS84 ellipsoid, the areas of these triangles represent ranges from 90.0 km 2 to 117.3 $km^2$. The triangles range is size because the earth is not a perfect sphere and therefore, the ellipsoid does not tessellate into a set of identical equilateral triangles of consistent edge length. The WGS84 ellipsoid model is chosen since, the model represents the Earth's shape by a radius of 6378137 meters in the equatorial plane and 6356752.3142 meter in the polar plane. The size of the triangles and therefore the number of recursions of the tessellation process may be varied depending on the desired size for an individual triangular element.

Although triangular elements are preferred primitives that make up the seed three-dimensional shape, other shapes such as rhomboids may be used. In one embodiment, a rhomboid is formed by the two adjacent triangles which form natural pairs. This creates a parallelogram-like shape that is not coplanar. Triangles are preferred, since triangles have the property that all points of the triangle are guaranteed to exist in a common plane. This has mathematical advantage of providing a linear basis for interpolating in the space.

Figure 5A:
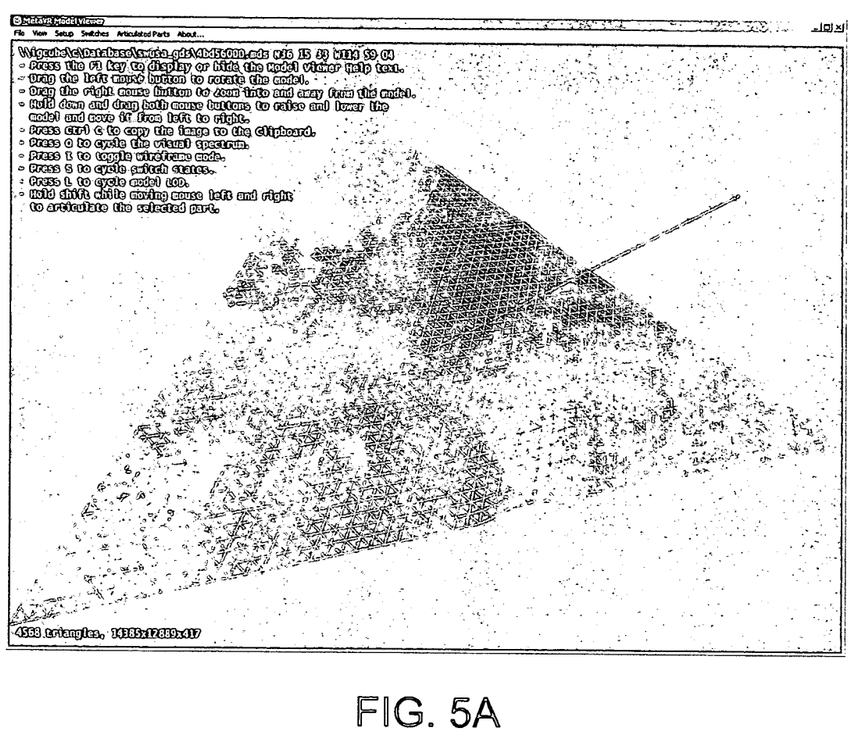
FIGS. 5A and 5B show a triangular element with and without shading and texture as would be represented on a user's display device.
Figure 5B:
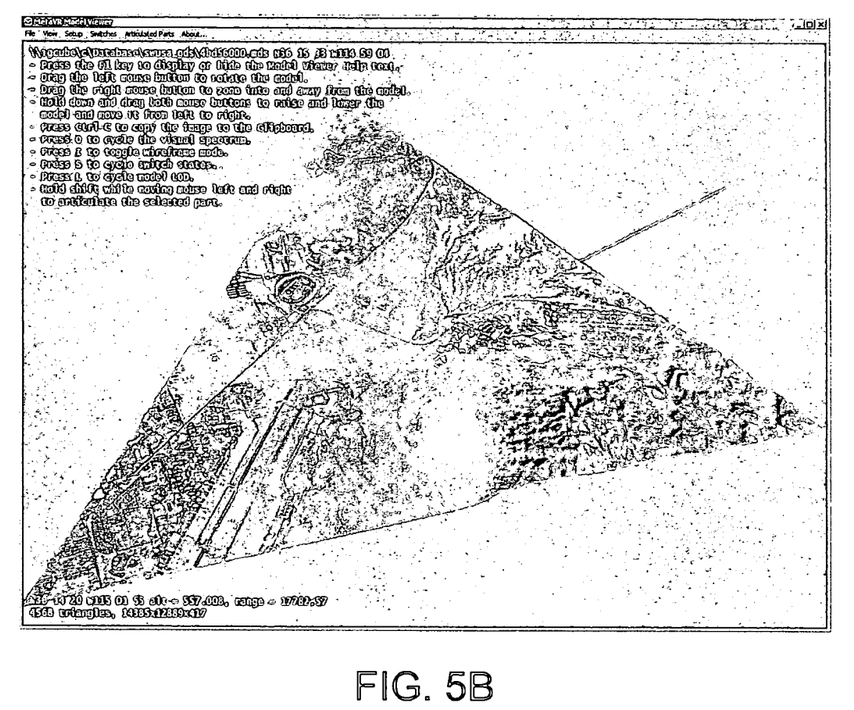

FIGS. 5A and 5B show two versions of a triangular tile element after it has been rendered and displayed on a display device. FIG. 5A shows the underlying skeletal structure which is defined by yet smaller triangular elements to form a wire frame topology of the desired region and any structures that are present within that region. FIG. 5B shows a fully rendered triangular tile element including shaded and textured polygons. For the database compiler, each triangular tile represents a single unit. Thus, the database can be updated or extended in triangular elements, for example, as mentioned above 100 $km^2$ chunks. Multiple database compilation processes can work in parallel on independent tiles within the desired geographic region(s) of interest. Thus, in the event of a hardware or software failure, the database compilation process can be restarted, picking up where it left off. The only work lost is the time taken to produce the last partial tile at the point of failure.

Figure 6:
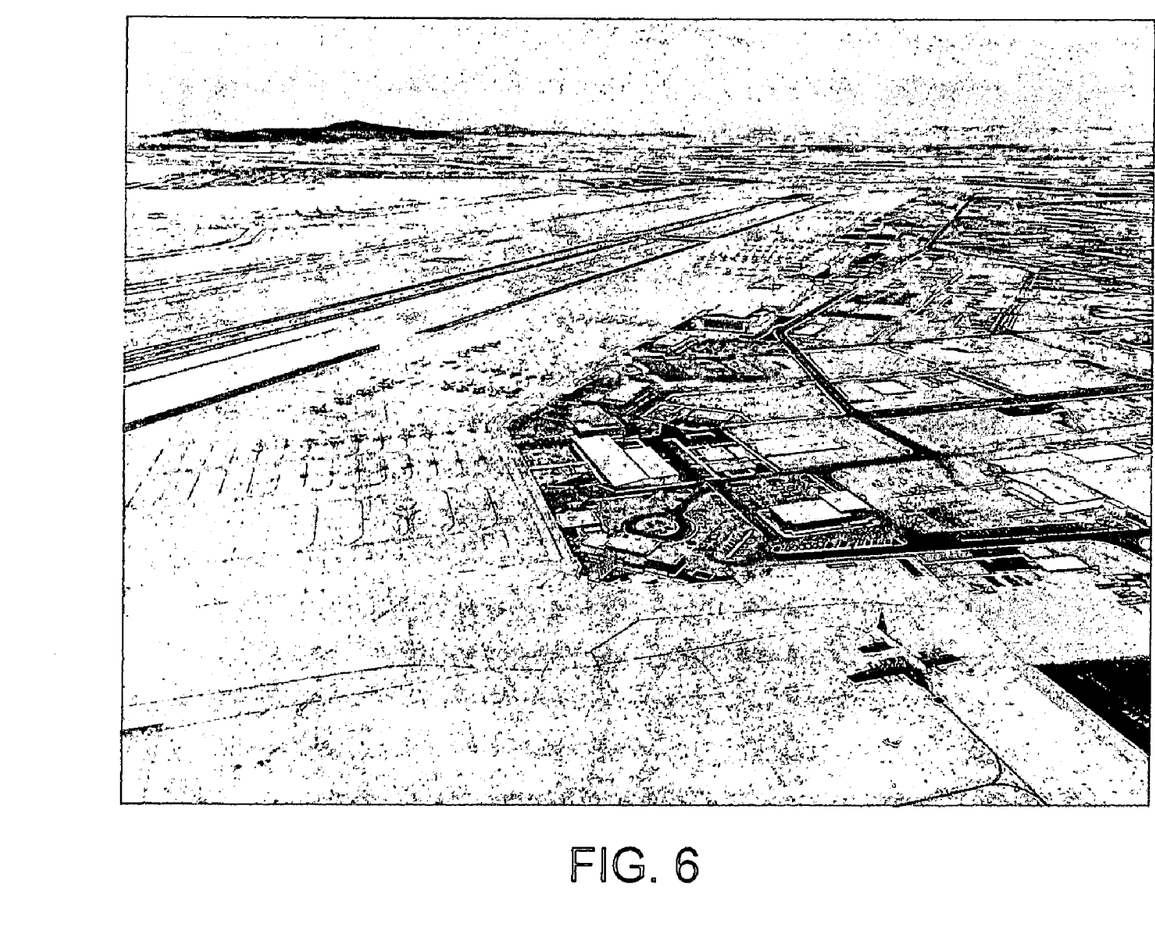
FIG. 6 shows a fully rendered image formed from a plurality of triangular elements.

FIG. 6 shows a filly rendered image. The image is rendered in a rendering engine by retrieving a plurality of triangular elements for a desired terrestrial location and rendering each of the triangular elements given a desired perspective view. In the process of rendering the image, the rendering engine transforms the coordinates to the display coordinate system by defining the viewing frustum from the defined parameters provided by the perspective view as described above with respect to FIGS. 3A and 3B. Each of the triangular elements that are within the viewing frustum (including partial elements) are combined together and displayed on the display device to form the image.

A given database compilation process, working on data from a triangular element of an entire area, need only see the source data that is relevant to that triangular element. This enables the database generation process to begin before the entirety of source data has been received or pre-processed. This also allows source data to be spread across multiple computers, each computer contributing to a different sub-region of the entire area mitigating the need for very large single volume storage such as a RAID.

The compilation process also affords a more pipelined visualization process. Under prior art monolithic database generation processes, the procedure was serial in nature where the time to produce the database was the sum of acquiring the source data, modifying, correcting, or enhancing, the source data, compiling the visualization database, and verifying the visualization database in the runtime system. The present system is fundamentally a pipeline where all four steps occur in sequence but tasks for different triangular element can be run in parallel. For example, as source material is acquired, it can immediately be modified, corrected, and enhanced for the compilation process before all source material arrives. Whatever source material is available can be given to the compilation stage to produce any covered triangular tiles. When each tile is compiled, the result can be immediately validated in the run-time system without waiting for any other portion of the desired coverage area to be completed.

The pipelined architecture is also highly scalable. Since each compilation is independent, an arbitrary number of compilers can be devoted to the task. In practice on datasets of varying resolution and constituent source data over using up to ten compilers, the performance is nearly linear in the number of compilers.

The geocentric visualization architecture using a tessellated three-dimensional shape is advantageous for point-to-point intervisibility tests. Particularly, long-range intervisibility tests, where curvature of the earth becomes an issue for the projected coordinate systems. The curvature is properly handled using triangle-based elements that have undergone tessellation. Prior art projection databases fail to produce accurate results under such circumstances.

Another capability not found in the prior art geocentric coordinate system visualization architectures is live-updating of terrain. At any time, a given triangular element can be compiled or recompiled and automatically instantiated in a running visualization. For example, if new imagery becomes available from a sensor in the field, a new triangular element can be generated on a time scale commensurate with the communication channel (in minutes or even seconds) and rebroadcast to any networked and listening 3D visualization rendering systems. The new or updated triangular element then populates the scene as appropriate. The implication is that operations such as mission rehearsal, distributed mission training, even battle damage assessment, are transformed by a living scene. When new information is available, it can be rendered in real-time from a 3D perspective. Further, over the course of the fielding process, tiles built with initially low-resolution source data can be updated with improved and higher-resolution source data and "integrated" simply by adding directory references to the run-time image generator's list of available terrain.

The geocentric coordinate system used for the terrain representation enables accuracy in simulation of targeting and intervisibility operations that do not degrade as a function of range. This results in better training of operators, pilots, navigators, and drivers. Likewise, the terrain sparsity (distributed, non-rectangular nature of the virtual database) affords a modular configuration of terrain for each system being simulated. Any given simulator is burdened only with the terrain needed to accomplish its training task, but that terrain came from a central pool shared by all the simulator assets as shown in FIG. 1 by the MDS tile repository.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A method for using terrestrial imagery data, the method comprising:
   accessing terrestrial imagery data;
   tessellating a polyhedron composed of a plurality of primitives a plurality of times until a desired resolution for a pagable primitive is reached;
   associating at least one position value with each primitive of the polyhedron;
   mapping the terrestrial imagery data to the tessellated polyhedron; and
   storing the data associated with at least one primitive;
   wherein the data associated with each primitive is stored in a separate file such that each file is pagable by a computer system.

2. The method according to claim 1, wherein the at least one position value includes latitude and longitude.

3. The method according to claim 1, wherein the at least one position value includes longitude and latitude coordinates for the vertices of each primitive of the polyhedron.

4. The method according to claim 1, wherein the polyhedron is in the shape of an ellipsoid.

5. The method according to claim 1, wherein the polyhedron is in the shape of a WGS84 ellipsoid.

6. The method according to claim 1, wherein the desired resolution is a segment size for the earth.

7. A method for using terrestrial imagery data, the method comprising:
   accessing terrestrial imagery data;
   tessellating a thee-dimensional shape at least until the thee-dimensional shape has a generally spherical shape formed by a plurality of primitives;
   mapping the terrestrial imagery data to the tessellated thee-dimensional shape;
   storing the data associated with at least one primitive;
   receiving a request for a desired view of a particular terrestrial location;
   accessing the stored data associated with the particular terrestrial location; and
   rendering the data on a display device.

8. The method according to claim 7, wherein each of the plurality of primitives is a triangle.

9. The method according to claim 8, wherein during each tessellation each of the triangular primitive primitives from the thee-dimensional shape is subdivided into four smaller triangles.

10. The method according to claim 7, wherein the terrestrial imagery data defines a plurality of terrestrial locations and each terrestrial location is associated with coordinates in a coordinate system.

11. The method according to claim 7, wherein accessing the stored data includes:
    determining each primitive having imagery data that is associated with the particular terrestrial location.

12. The method according to claim 11, wherein the data associated with each primitive has an associated file name and the associated file name is indicative of a history of the tessellation.

13. The method according to claim 12, wherein determining each primitive that is associated with the particular terrestrial location includes:
    determining a geometric primitive in the thee-dimensional shape prior to tessellation that is associated with the particular terrestrial location;
    based on the determined geometric primitive in the thee-dimensional shape prior to tessellation, determining the primitives using the associated file name.

14. The method according to claim 11 wherein determining each primitive having imagery data that is associated with the particular terrestrial location, includes
    receiving a perspective defined by at least a position, an orientation and a field of view;
    defining a viewing frustum;
    determining whether any of the primitives from the thee-dimensional shape intersect the viewing frustum;
    if a primitive of the thee dimensional shape intersects the viewing frustum, tessellating the primitive into a plurality of smaller primitives and testing which of the smaller primitives intersect the viewing frustum.

15. The method according to claim 7, further comprising: convening the imagery data to a geocentric coordinate system.

16. A method for rendering a perspective view of a desired location to a resolution level on a computer display, the method comprising:
    defining a viewing frustum based upon the perspective view;
    retrieving data representative of a thee dimensional shape composed of a plurality of primitives;
    determining which of the primitives from the thee dimensional shape intersect the viewing frustum;
    for each primitive of the thee-dimensional shape that intersects the viewing frustum, repeatedly tessellating the primitive into a plurality of smaller primitives and testing which of the smaller primitives intersect the viewing frustum until the resolution level is achieved;
    identifying data associated with each of the smaller primitives that intersect the viewing frustum; and
    rendering the data associated with each of the smaller primitives.

17. A method according to claim 16, wherein the data is identified based on a file name associated with the data.

18. A method according to claim 16 wherein the data representative of the three dimensional shape includes location information for the plurality of primitives.

19. A method according to claim 18 wherein the location information indicates a location on the earth associated with the primitive.

20. A method for rendering a desired geographical location on a computer display, the method comprising:
- defining a viewing frustum based upon a perspective view;
- tessellating a three-dimensional object having a plurality of primitives to a given resolution, the three-dimensional object representing a celestial body having the desired geographical location;
- determining which of the primitives are at least partially within the viewing frustum; and
- rendering the geographical location based on data associated with the primitives within the viewing frustum.

21. The method according to claim 20 further comprising, after each tessellation, determining which of the primitives are at least partially within the viewing frustum.

22. The method according to claim 21, further comprising:
- disregarding the primitives that are not within the viewing frustum.

23. The method according to claim 20, further comprising:
- retrieving data for rendering from a database wherein the database has an association between primitives and data for rendering.

24. A computer program product having computer code for using terrestrial imagery data, the computer code embodied in a computer readable medium, comprising:
- computer code for accessing terrestrial imagery data;
- computer code for mapping the terrestrial imagery data to a tessellated thee-dimensional shape composed of a plurality of primitives wherein the thee-dimensional shape is representative of a celestial body; and
- computer code for storing the data associated with at least one primitive;
- wherein the data associated with each primitive is stored in a separate file such that each file is pagable by a computer system.

25. The computer program product according to claim 24, further comprising:
- computer code for tessellating the thee-dimensional shape a plurality of times until a desired resolution for a pagable primitive is reached.

26. The computer program product according to claim 25, wherein the desired resolution is a segment size for the earth.

27. The computer program product according to claim 25, further comprising:
- computer code for associating at least one position value with each primitive of the thee-dimensional shape prior to tessellating the thee-dimensional shape.

28. The computer program product according to claim 26, wherein the at least one position value includes latitude and longitude.

29. The computer program product according to claim 26, wherein the at least one position value includes longitude and latitude coordinates for the vertices of each primitive of the thee-dimensional shape.

30. A computer program product having computer code for using terrestrial imagery data, the computer code embodied in a computer readable medium, comprising:
- computer code for accessing terrestrial imagery data;
- computer code for tessellating a thee-dimensional shape at least until the thee-dimensional shape has a generally spherical shape;
- computer code for mapping the terrestrial imagery data to a tessellated thee-dimensional shape composed of a plurality of primitives wherein the thee-dimensional shape is representative of a celestial body; and
- computer code for storing the data associated with at least one primitive.

31. The computer program product according to claim 30, wherein each of the plurality of primitives is a triangle, and during each tessellation each of the triangular primitives from is subdivided into four smaller triangles.

32. The computer program product according to claim 30, wherein the terrestrial imagery data defines a plurality of terrestrial locations and each terrestrial location is associated with coordinates in a coordinate system.

33. The computer program product according to claim 30, further comprising: computer code for convening the imagery data to a geocentric coordinate system.

34. A computer program product having computer program code for using terrestrial imagery data, the computer code embodied in a computer readable medium, comprising:
- computer code for accessing terrestrial imagery data;
- computer code for mapping the terrestrial imagery data to a tessellated thee-dimensional shape composed of a plurality of primitives wherein the thee-dimensional shape is representative of a celestial body;
- computer code for the data associated with at least one primitive;
- computer code for receiving a request for a desired view of a particular terrestrial location;
- computer code for accessing the stored data associated with the particular terrestrial location; and
- computer code for rendering the data on a display device.

35. The computer program product according to claim 34, wherein computer code for accessing the stored data includes:
- computer code for determining each primitive having imagery data that is associated with the particular terrestrial location.

36. The computer program product according to claim 35, wherein the data associated with each primitive has an associated file name and the associated file name is indicative of a history of the tessellation.

37. The computer program product according to claim 36, wherein the computer code for determining each primitive that is associated with the particular terrestrial location includes:
- computer code for determining a geometric primitive in the thee-dimensional shape prior to tessellation that is associated with the particular terrestrial location;
- computer code for determining the primitives using the associated file name, based on the determined geometric primitive in the thee-dimensional shape prior to tessellation.

38. The computer program product according to claim 37 wherein the computer code for determining each primitive having imagery data that is associated with the particular terrestrial location, includes:
- computer code for receiving a perspective defined by at least a position, an orientation and a field of view;
- computer code for defining a viewing frustum;
- computer code for determining whether any of primitives from the thee dimensional shape intersect the viewing frustum;
- computer code for tessellating the primitive into a plurality of smaller primitives and testing which of the smaller primitives intersect the viewing frustum, if a primitive of the thee-dimensional shape intersects the viewing frustum.

39. A computer program product having computer code for rendering a perspective view of a desired location to a resolution level on a computer display, the computer code embodied in a computer readable medium, comprising:

computer code for defining a viewing frustum based upon the perspective view;

computer code for retrieving data representative of a thee-dimensional shape composed of a plurality of primitives;

computer code for determining which of the primitives from the thee-dimensional shape intersect the viewing frustum;

computer code for repeatedly tessellating the primitive into a plurality of smaller primitives and testing which of the smaller primitives intersect the viewing frustum until the resolution level is achieved for each primitive of the thee-dimensional shape that intersects the viewing frustum;

computer code for identifying data associated with each of the smaller primitives that intersect the viewing frustum; and     computer code for rendering the data associated with each of the smaller primitives.

40. A computer program product according to claim 39, wherein the data is identified based on a file name associated with the data.

41. A computer program product according to claim 39 wherein the data representative of the thee-dimensional shape includes location information for the plurality of primitives.

42. A computer program product according to claim 41 wherein the location information indicates a location on the earth associated with the primitive.

43. A computer program product having computer code for rendering a desired geographical location on a computer display, the computer code embodied in a computer readable medium, comprising:

computer code for defining a viewing frustum based upon a perspective view;

computer code for tessellating a thee-dimensional shape having a plurality of primitives to a given resolution, the thee-dimensional shape representing a celestial body having the desired geographical location;

computer code for determining which of the primitives are at least partially within the viewing frustum; and     computer code for rendering the geographical location based on data associated with the primitives within the viewing frustum.

44. The computer program product according to claim 43 further comprising:

computer code for determining which of the primitives are at least partially within the viewing frustum, after each tessellation.

45. The computer program product according to claim 44, further comprising:

computer code for disregarding the primitives that are not within the viewing frustum.

46. The computer program product according to claim 43, further comprising:

computer code for retrieving data for rendering from a database wherein the database has an association between primitives and data for rendering.

\* \* \* \* \*

UNITED STATES PATENT AND TRADEMARK OFFICE
CERTIFICATE OF CORRECTION

PATENT NO. : 7,425,952 B2 Page 1 of 1
APPLICATION NO. : 11/113804
DATED : September 16, 2008
INVENTOR(S) : Richard M. Rybacki et al.

It is certified that error appears in the above-identified patent and that said Letters Patent is hereby corrected as shown below:

In Col. 2, lines 41 and 42; Col. 6, lines 26, 27, 28, 39, and 57; Col. 9, lines 57, 58, 60, and 61; Col. 10, lines 5, 22, 25, 26, 35, 36, and 53; Col. 11, lines 30, 31, 40, 48, 49, 56, 61, 62, 65, and 66; Col. 12, lines 19, 20, 44, 48, and 64; Col. 13, lines 5, 6, 9, 15, and 27; Col. 14, lines 7 and 9:
    replace "thee-dimensional"
    with "three-dimensional"

In Col. 10, lines 37, 49, and 51; Col. 12, line 59:
    replace "thee dimensional"
    with "three dimensional"

In Col. 10, line 4:
    replace "triangular primitive primitives from"
    with "triangular primitives from"

In Col. 10, line 42:
    replace "convening"
    with "converting"

In Col. 12, lines 5 and 6:
    replace "triangular primitives from is subdivided"
    with "triangular primitives is subdivided"

Signed and Sealed this

Second Day of December, 2008

JON W. DUDAS
*Director of the United States Patent and Trademark Office*